US005366060A

United States Patent [19]

Johnson et al.

[11] Patent Number: 5,366,060

[45] Date of Patent: Nov. 22, 1994

[54] BALUSTRADE HANDRAIL ENTRY HOUSING

[76] Inventors: Gerald E. Johnson, 11 Field Rock Rd., Farmington, Conn. 06032; Ronald Laliberte, 101 Waterbury Rd., Prospect, Conn. 06712; Frank M. Sansevero, 385 Addison Rd., Glastonbury, Conn. 06033; Willy Adrian, Hauptstrasse 33, 31683, Obernkirchen, Germany; Gerald Wente, Meinserstrasse 2, 31867, Pohle, Germany; R. Zimmerman, Schillerstr. 15, 89179, Beimerstetten, Germany

[21] Appl. No.: 132,513

[22] Filed: Oct. 7, 1993

[51] Int. Cl.[5] .............................................. B65G 17/00

[52] U.S. Cl. .................................... 198/323; 198/335; 198/338

[58] Field of Search ................ 198/323, 335, 337, 338

[56] References Cited

U.S. PATENT DOCUMENTS

| | | | |
|---|---|---|---|
| D. 318,357 | 7/1991 | Adrian et al. | D34/28 |
| 3,809,206 | 5/1974 | Bredehorn et al. | 198/338 X |
| 3,989,133 | 11/1976 | Courson et al. | 198/335 |
| 5,040,659 | 8/1991 | Saito et al. | 198/335 X |
| 5,156,252 | 10/1992 | Mello et al. | 198/338 |
| 5,245,315 | 9/1993 | JohInson | 198/323 X |

FOREIGN PATENT DOCUMENTS

| | | | |
|---|---|---|---|
| 0061088 | 5/1977 | Japan | 198/323 |

*Primary Examiner*—Cheryl L. Gastineau

[57] ABSTRACT

A balustrade handrail entry housing is provided for a balustrade having a base, a handrail, and a balustrade panel. The balustrade entry housing includes a frame, a shell, a channel formed within the frame for receiving the balustrade panel, apparatus for clamping the balustrade panel in the channel, and a face plate having apparatus for mounting a safety device for sensing obstructions entering the handrail entry housing around the handrail. The frame is independent of the balustrade base and the balustrade panel, and therefore may be positionally adjusted relative to both. The shell, which is independent of the frame, mounts on and is supported by the frame. The shell may be positionally adjusted relative to the balustrade base and balustrade panel.

9 Claims, 4 Drawing Sheets

BALUSTRADE HANDRAIL ENTRY HOUSING

DESCRIPTION

1. Technical Field

This invention relates to people moving devices in general, and balustrade handrail entry housings for people moving devices in particular.

2. Background Art

Escalators, moving walkways, and other people moving devices efficiently move a large volume of pedestrian traffic from one point to another. Passengers step on moving steps (or belts, treads, or pallets) and are transported along at a constant rate of speed. For safety reasons, a passenger handrail is provided on each side of the steps, traveling in the same direction and speed as the steps.

A balustrade assembly, extending from the entry to the exit of the people moving device, supports and guides each handrail. Each balustrade assembly includes a plurality of balustrade panels (typically glass) which rise up from a base to support the handrail. Externally, the base consists of a number of enclosure panels including an outer decking, an outer cladding, an inner profile, and a skirt panel. The outer decking and outer cladding enclose the mechanics on the side of the balustrade panel opposite the moving steps. The inner profile and skirt panel enclose the mechanics adjacent the moving steps.

The handrails are connected into endless loops which travel from one end of the device to the other along the top of the balustrade panels and then return through the base of the balustrade assembly. At each end of the balustrade assemblies, the balustrade panels have curved sections, or "newels", which enable the handrails to curve down and into the base of the balustrade. The end of the balustrade where the handrail enters the base and the end where it exits, depends on which direction the steps are traveling.

A person of ordinary skill in the art will recognize that there are two predominant design approaches to the area of the balustrade base where the handrail enters the base. In the first approach, a finished end panel is fixed in a plane perpendicular to the base enclosure panels described heretofore. Typically a safety device for sensing obstructions entering the base around the handrail is fixed to the end panel. In some cases, an aesthetic shroud is fixed to the end panel above the safety device to conceal the safety device.

A disadvantage of this approach is that the aesthetic options of the end panel, and possibly the shroud, are somewhat limited because the end panel generally must conform to the contour of the base. Another disadvantage of using the end panel approach is that each end panel design is unique to the geometry of the base chosen. Hence, if "x" number of base geometries are used, there must be "x" number of end panels.

The second predominant design approach utilizes a cast handrail entry housing. The casting may be fabricated from a wide variety of materials including aluminum and plastic. The advantage of using a casting is that many more aesthetic geometries are possible. This advantage is significant because the entry and exit areas of the people moving device are the most noticed by passengers. A disadvantage of a cast housing is that, like the finished end panel, it must conform to the geometry of the balustrade base. Different base geometries require different cast entry housings. A further disadvantage of cast handrail entry housings is the cost of producing the castings.

DISCLOSURE OF THE INVENTION

It is, therefore, an object of the present invention to provide a balustrade handrail entry housing which may be easily adapted to different balustrade geometries.

It is a further object of the present invention to provide a balustrade handrail entry housing which is easily manufactured.

It is a still further object of the present invention to provide a balustrade handrail entry housing which is inexpensive to manufacture.

According to the present invention, a balustrade handrail entry housing is provided having a frame and a shell, independent of the frame. The shell mounts on, and is supported by, the frame.

According to one aspect of the present invention, the entry housing frame further comprises means for supporting a balustrade panel.

According to another aspect of the present invention, the entry housing frame further comprises means for mounting a safety device for sensing obstructions adjacent the handrail entering the base of the balustrade assembly.

According to still another aspect of the present invention, an independent face plate is provided having means for mounting a safety device for sensing obstructions adjacent the handrail entering the base of the balustrade assembly.

The independence of the shell and the frame provides several key advantages. First, the independence allows different shaped shells to be mounted on a single style frame. One frame, therefore, may be used for several different style balustrade assemblies. Second, the independence between the frame and the shell allows the frame to either be modified to receive new safety devices as required, or to be adaptable to several different style safety devices, all the while still using the same shell. Third, the independence of the frame and the shell facilitates the installation of the entry housing. In particular, the frame can be installed and adjusted relative to the balustrade panel without the shell attached, thereby increasing the room the installer has to work in.

Another advantage of the present invention is the ease of which the present invention may be manufactured. Specifically, the aesthetically important shell may by fabricated by bending sheet metal, rather than casting it.

These and other objects, features and advantages of the present invention will become more apparent in light of the detailed description of the best mode embodiment, thereof, as illustrated in the accompanying drawings.

DETAILED DESCRIPTION OF THE DRAWINGS

BEST MODE FOR CARRYING OUT THE INVENTION

Figure 1:
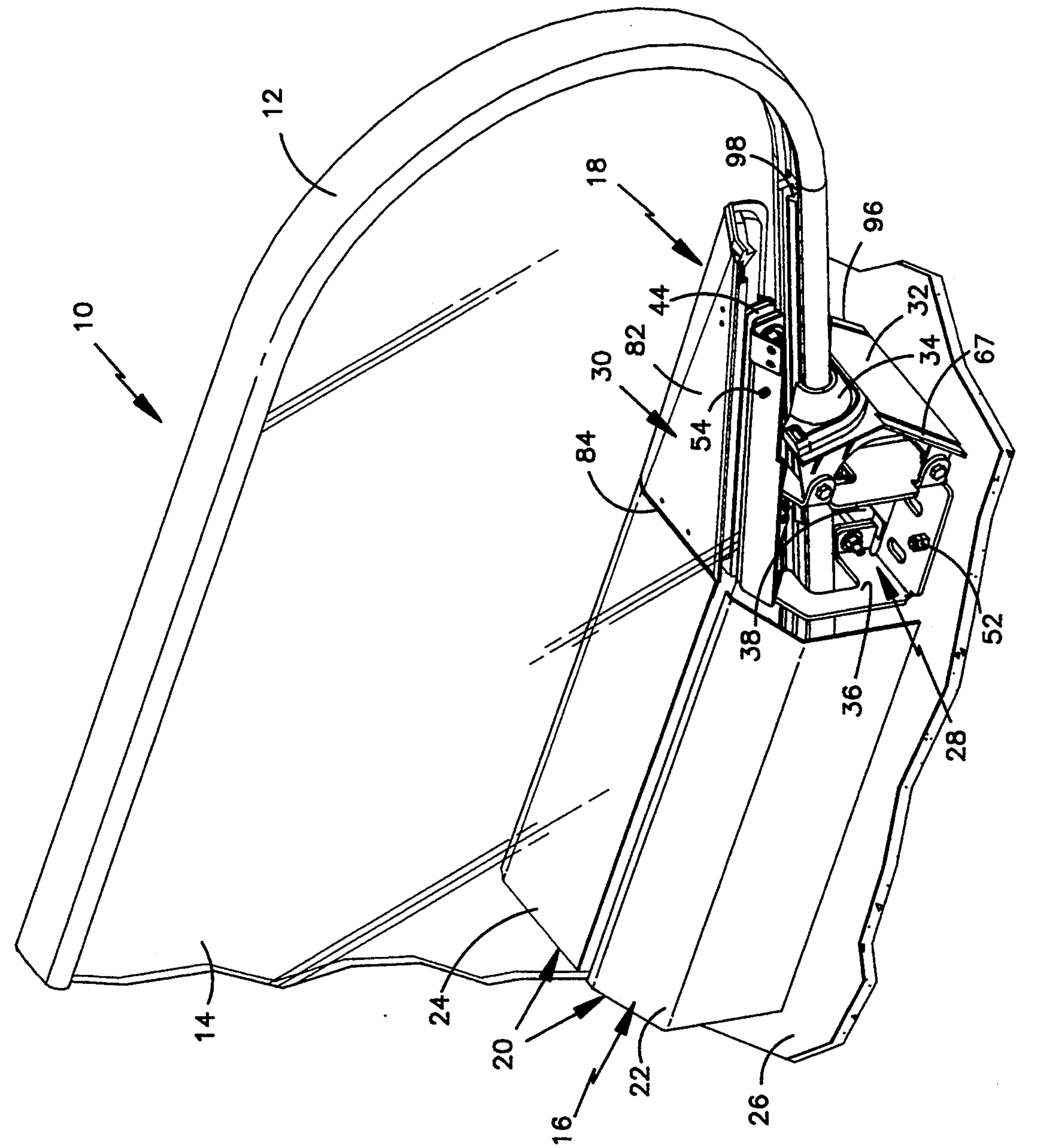
FIG. 1 is a cross-sectional isometric view of the balustrade assembly.

Now referring to FIG. 1, a balustrade assembly 10 for an escalator is shown having a handrail 12, a balustrade panel 14, a base 16, and a handrail entry housing 18. The base 16 comprises a plurality of enclosure panels 20, including a skirt panel (not shown), an inner decking 22, an outer decking 24, and an outer cladding (not shown), and an internal support structure (not shown), as is known in the art. The enclosure panels 20 typically attach to the internal support to form the rigid base 16. The balustrade panels 14 are received within the base 16 and, like the enclosure panels 20, are supported by the internal support structure. A handrail guide 98 attached to the balustrade panels 14 guides the handrail 12 along the periphery of the panels 14.

Figure 2:
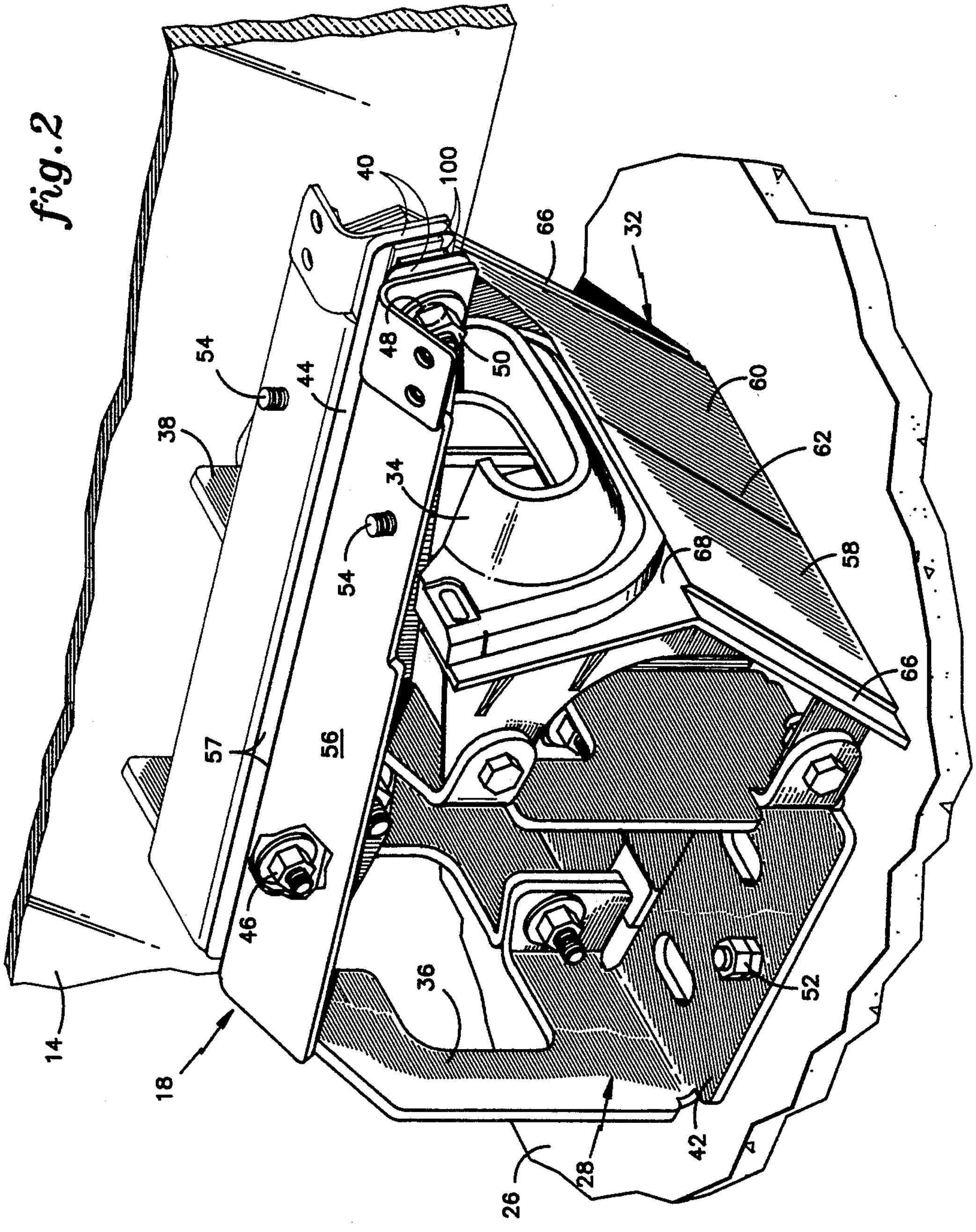
FIG. 2 is an isometric view of the handrail entry housing frame shown in FIG. 1 with an integrally attached face plate.

Referring to FIGS. 1 and 2, the handrail entry housing 18, attached to an escalator floor plate 26, comprises a frame 28, a shell 30 (see FIG. 1), a faceplate 32, and a safety device 34. The frame 28 consists of a left half 36 and a right half 38. Each half 36,38 includes a base 42, a first stud 52 attached to the base 42, and a clamp surface 40 oriented at an angle to the base 42. Each clamp surface 40 includes an outside lip 56 and a channel wall 57. A second stud 54 is fixed to the outside lip 56 and a plurality of channel bolts 46 are threaded into the channel wall 57. Each channel wall 57 further includes a hole 48.

When the two halves 36,38 are bolted together, the two clamp surfaces 40 form a channel 44 for receiving and supporting a balustrade panel 14. The holes 48 in the channel walls 57 are aligned with one another, thereby enabling the holes 48 and the balustrade panel 14 to receive a bolt 50. The plurality of channel bolts 46, and the bolt 50, secure the balustrade panel 14 within the channel 44. A person of ordinary skill in the art will recognize that other means of clamping the balustrade panel 14 in the channel 44 exist and may be used alternatively.

Referring to FIG. 2 in a first embodiment, the face plate 32 consists of two halves 58,60 integrally attached to the frame halves 36,38. When the two frame halves 36,38 are joined, the face plate halves 58,60 form a finished surface 62. A step 66 is formed on each side of the finished surface 62, parallel to the channel 44. The two face plate halves 58,60 also form a mounting surface 68 for mounting a safety device 34.

Figure 3:
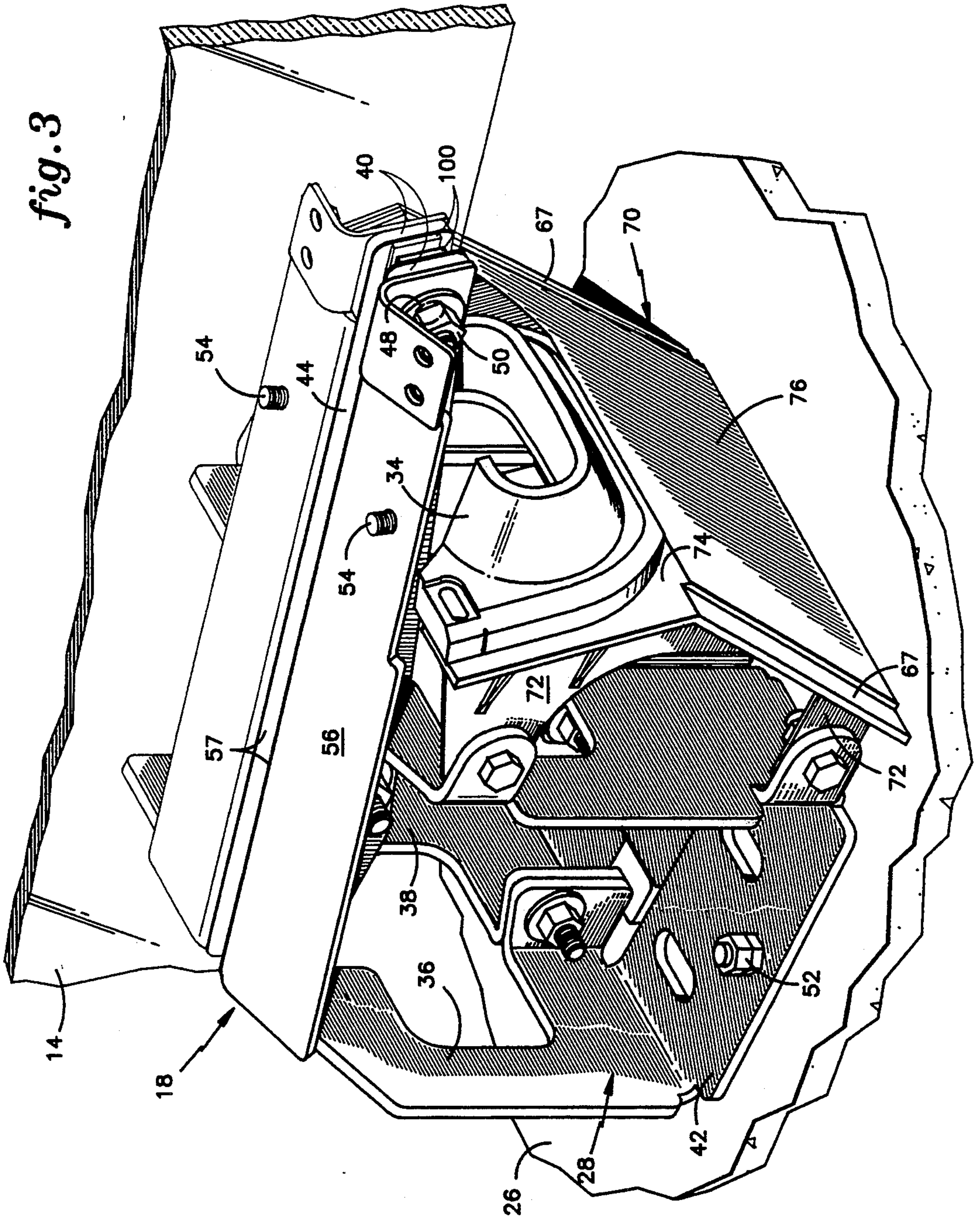
FIG. 3 is an isometric view of the handrail entry housing frame shown in FIG. 1 with an attached independent face plate.

Referring to FIG. 3, in a second embodiment, an independent face plate 70 is employed having a plurality of tabs 72 for attaching the face plate to the connected frame halves 36,38, a mounting surface 74 for mounting a safety device 34, and a finished surface 76. A step 67 is formed on each side of the finished surface 76, parallel to the channel 44.

Figure 4:
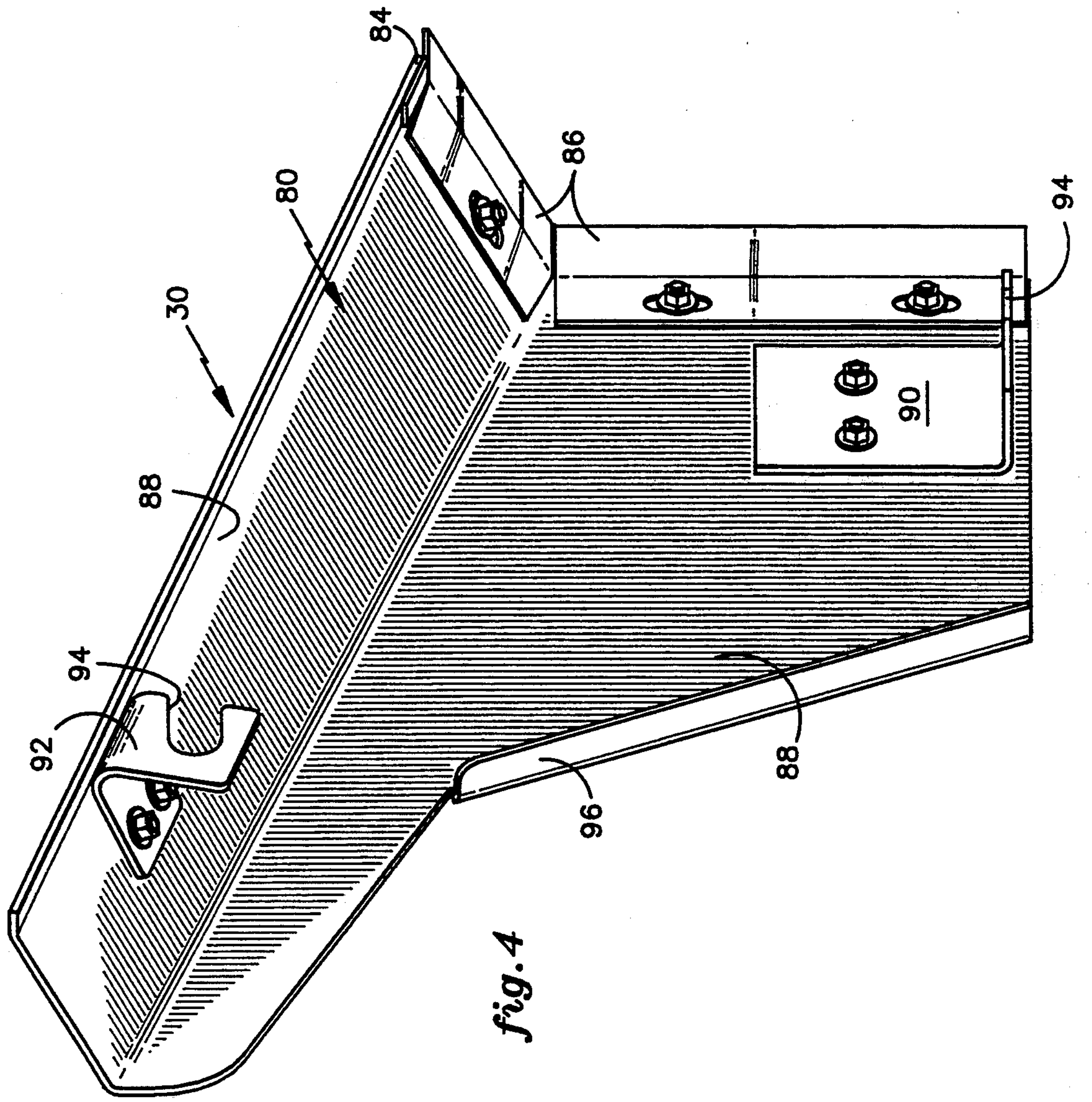
FIG. 4 is an isometric view of the handrail entry housing shell half which is missing from FIG. 1.

Referring to FIGS. 1 and 4, the shell 30 consists of a left 80 (see FIG. 4) and a right 82 shell half formed from sheets of stainless steel metal. Specifically, the left shell half 80 not shown in FIG. 1, is shown alone and enlarged in FIG. 4 to better illustrate the shell and frame concept. A person of ordinary skill in the art will recognize that a wide variety of metals, plastics, and other materials may be used in lieu of stainless steel. Each shell half 80,82 is formed on the end 84 closest to the balustrade base 16 to match the contour of the balustrade base enclosure panels 20 on that side. A connecting flange 86 is attached to the inside surfaces 88 of the half at the balustrade base end. A first support flange 90 is attached to the bottom of the inside surface 88 of each shell half 80,82. A second support flange 92 is attached to the upper inside surface 88 of each shell half 80,82. The first and second support flanges 90,92 have open slots 94 for receiving the first and second studs 52,54, respectively, which are attached to the frame 28. The shell halves 80,82 also include flanges 96 which wrap around to meet either embodiment of the face plate 32,70. The flanges 96 are received by the steps 66,67 on each side of the finished surface 62,76.

Referring to FIG. 1, in the assembly of the balustrade, a balustrade panel 14 having an arcuated end is fixed in the support structure of the balustrade base, such that a predetermined length of the panel extends out past the support structure. The handrail 12 moves along the periphery of the exposed balustrade panels 14.

The handrail entry housing frame halves 36,38 are positioned adjacent the end of the base 16 where the handrail 12 enters, loosely attached to one another, with one on each side of the balustrade panel 14. Cardboard cushions 100 (see FIGS. 2 and 3) are placed on each side of the balustrade panel 14 positioned within the channel 44 formed between the two halves 36,38. Once the position of the balustrade panel 14 is correct, the frame halves 36,38 are fixed to one another and to the floorplate 26 of the escalator. If necessary, the balustrade panel 14 can be further adjusted using the bolts 46 (see FIGS. 2 and 3) threaded in the clamp surfaces 40. A person of ordinary skill in the art will recognize that a other means may be used to adjust the position of, and clamp, the balustrade panel 14.

In the first embodiment, described heretofore, the integral faceplate 32 is formed when the frame halves 36,38 (see FIG. 2) are attached to one another. In the second embodiment, the independent faceplate 70 is attached to the frame 28 in a separate step. In both cases, the safety device 34 is attached to the faceplate 32,70.

Referring to FIGS. 1 and 4, each shell half 80,82 is attached to the frame 28 by first inserting the connecting flange 86 under the enclosure panel 20 on that side of the balustrade base 16. The connecting flange 86 is received inside the base enclosure panel 20, thereby preventing the shell half 80,82 from separating from the adjacent base enclosure panel 20. As the connecting flange 86 is inserted further under the enclosure panel 20, the openings of the slots 94 in the first and second support brackets 90,92 will align with the first and second studs 52,54 attached to the frame 28. At that point the shell half 80,82 is manipulated such that the studs 52,54 are inserted within the slots 94. The position of each shell half 80,82 is then aligned with the enclosure panel 20, the balustrade panel 14, and the other shell half 82,80. Once aligned, the shell half 80,82 is fixed to the frame 28 using the studs 52,54 and support brackets 90,92. A person of ordinary skill in the art will recognize that there are a variety of ways to attach the shells to the frame.

Although this invention has been shown and described with respect to the detailed embodiments thereof, it will be understood by those skilled in the art that various changes in form and detail thereof may be made without departing from the spirit and scope of the claimed invention.

We claim:

1. A balustrade handrail entry housing for a balustrade having a base, a handrail, and a balustrade panel, comprising:

a frame, independent of said balustrade base and balustrade panel;

a shell, independent of said frame, wherein said shell mounts on and is supported by said frame;

a channel, formed within said frame, for receiving said balustrade panel;

means for clamping said balustrade panel in said channel; and a face plate, attached to said frame, having means for mounting a safety device for sensing obstructions entering the handrail entry housing around the handrail.

2. A balustrade entry housing according to claim 1, wherein said frame is mounted on a floor panel adjacent the balustrade base and therefore may be positionally aligned relative to said balustrade base and balustrade panel.

3. A balustrade entry housing according to claim 2, wherein said frame further comprises:

a first half, having a clamping surface; and a second half, having a clamping surface;

wherein said first and second half are attached to one another by conventional fasteners and said clamping surfaces form said channel for receiving said balustrade panel; and wherein the position of each half may be adjusted relative to said balustrade base, relative to said balustrade panel, and relative to each other.

4. A balustrade entry housing according to claim 3, wherein said shell further comprises:

a first half; and a second half;

wherein the position of each half may be adjusted relative to said balustrade base, relative to said balustrade panel, and relative to each other.

5. A balustrade entry housing according to claim 1, wherein said frame is mounted on a floor panel adjacent the balustrade base and therefore may be positionally aligned relative to said balustrade base and balustrade panel.

6. A balustrade entry housing according to claim 5, wherein said shell, said face plate, and said floor panel enclose said frame.

7. A balustrade entry housing according to claim 6, wherein said frame further comprises:

a first half, having a clamping surface; and a second half, having a clamping surface;

wherein said first and second half are attached to one another by conventional fasteners and said clamping surfaces form said channel for receiving said balustrade panel; and wherein the position of each half may be adjusted relative to said balustrade base, relative to said balustrade panel, and relative to each other.

8. A balustrade entry housing according to claim 7, wherein said shell further comprises:

a first half; and a second half;

wherein the position of each half may be adjusted relative to said balustrade base, relative to said balustrade panel, and relative to each other.

9. A balustrade handrail entry housing for a balustrade having a base, a handrail, and a balustrade panel, comprising:

a frame, independent of said balustrade base and balustrade panel;

a shell, independent of said frame, wherein said shell mounts on and is supported by said frame;

a channel, formed within said frame, for receiving said balustrade panel;

means for clamping said balustrade panel in said channel; and means for mounting a safety device for sensing obstructions entering the handrail entry housing around the handrail, said means attached to said frame.

* * * * *